United States Patent
Kang et al.

(10) Patent No.: US 10,013,084 B2
(45) Date of Patent: Jul. 3, 2018

(54) BENDABLE TOUCH WINDOW AND TOUCH DEVICE WITH THE SAME

(71) Applicant: LG INNOTEK CO., LTD., Seoul (KR)

(72) Inventors: Mun Suk Kang, Seoul (KR); Do Youb Kwon, Seoul (KR); Ji Chang Ryu, Seoul (KR); Soung Kyu Park, Seoul (KR); Seok Pyo Yun, Seoul (KR); Gyu Rin Lee, Seoul (KR); Jin Seok Lee, Seoul (KR); Chung Wan Lee, Seoul (KR); Jae Hak Her, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 79 days.

(21) Appl. No.: 14/624,962

(22) Filed: Feb. 18, 2015

(65) Prior Publication Data

US 2015/0234512 A1 Aug. 20, 2015

(30) Foreign Application Priority Data

Feb. 17, 2014 (KR) .................. 10-2014-0018129

(51) Int. Cl.
*G06F 3/041* (2006.01)

(52) U.S. Cl.
CPC .......... *G06F 3/0412* (2013.01); *G06F 3/0416* (2013.01); *G06F 2203/04102* (2013.01)

(58) Field of Classification Search
CPC ......... G06F 2203/04103; G06F 1/1652; G06F 3/0412; G06F 3/044; G06F 3/045; G06F 3/041; G01R 27/26; G06K 11/06; G08C 21/00

See application file for complete search history.

(56) References Cited

U.S. PATENT DOCUMENTS

| | | | | |
|---|---|---|---|---|
| 2009/0315840 A1* | 12/2009 | Park | ................ | G02F 1/13338 345/173 |
| 2011/0012845 A1* | 1/2011 | Rothkopf | ................ | G06F 3/044 345/173 |
| 2011/0227842 A1* | 9/2011 | Lin | ................ | G06F 3/044 345/173 |
| 2012/0111491 A1* | 5/2012 | Huang | ................ | H05K 1/028 156/247 |

(Continued)

FOREIGN PATENT DOCUMENTS

KR 10-2013-0125239 A 11/2013
KR 10-2014-0001374 A 1/2014

OTHER PUBLICATIONS

European Search Report dated Jul. 21, 2015 issued in Application No. 15154882.3.

*Primary Examiner* — Pegeman Karimi
(74) *Attorney, Agent, or Firm* — Ked & Associates, LLP

(57) ABSTRACT

A touch window includes a substrate; a sensing electrode disposed on the substrate in a bending direction of the substrate; and a wire for electrically connecting the sensing electrode. The sensing electrode includes a first sensing electrode extending in one direction on an effective area; and a second sensing electrode extending in a direction different from the extension direction of the first sensing electrode. The wire includes a first wire connected to the first sensing electrode; and a second wire connected to the second sensing electrode.

9 Claims, 13 Drawing Sheets

(56) References Cited

U.S. PATENT DOCUMENTS

| | | | |
|---|---|---|---|
| 2012/0313873 A1* | 12/2012 | Bright | G06F 3/044 345/173 |
| 2013/0076649 A1* | 3/2013 | Myers | H04M 1/0268 345/173 |
| 2013/0180841 A1* | 7/2013 | Yilmaz | G06F 3/044 200/600 |
| 2013/0201348 A1* | 8/2013 | Li | G06F 3/044 348/174 |
| 2013/0215035 A1* | 8/2013 | Guard | G06F 3/0221 345/168 |
| 2013/0248230 A1* | 9/2013 | Park | G06F 3/044 174/255 |
| 2013/0300677 A1* | 11/2013 | Kim | G06F 3/0414 345/173 |
| 2013/0342429 A1 | 12/2013 | Choi et al. | 345/30 |
| 2014/0218308 A1* | 8/2014 | Yeh | G06F 3/041 345/173 |
| 2014/0218631 A1* | 8/2014 | Kang | G06F 3/044 349/12 |
| 2014/0354304 A1* | 12/2014 | Omote | G06F 3/041 324/658 |
| 2014/0354558 A1* | 12/2014 | Cho | G06F 3/0412 345/173 |
| 2015/0047957 A1* | 2/2015 | Tokuno | G06F 3/041 200/295 |
| 2015/0130726 A1* | 5/2015 | Min | G06F 3/0412 345/173 |
| 2015/0130751 A1* | 5/2015 | Teraguchi | G02F 1/13338 345/174 |
| 2015/0185915 A1* | 7/2015 | Lim | G06F 3/044 345/174 |
| 2015/0242012 A1* | 8/2015 | Petcavich | G06F 1/1652 345/174 |
| 2015/0363023 A1* | 12/2015 | Kawaguchi | G06F 3/044 345/174 |

\* cited by examiner

BENDABLE TOUCH WINDOW AND TOUCH DEVICE WITH THE SAME

CROSS-REFERENCE TO RELATED APPLICATION

This application claims priority under 35 U.S.C. § 119 to Korean Application No. 10-2014-0018129 filed on Feb. 17, 2014, whose entire disclosure is incorporated herein by reference.

BACKGROUND

1. Field

The disclosure relates to a touch window and a touch device including the same.

2. Background

Recently, a touch panel, which performs an input function through the touch to an image displayed on a touch device by an input, such as a stylus pen or a finger, has been applied to various electronic appliances. The touch panel may be typically classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user touches the capacitive touch panel between electrodes. When taking into consideration the convenience of a fabrication scheme and a sensing power, the capacitive touch panel has been spotlighted in a smaller model touch panel recently.

Meanwhile, the demand for a flexible touch panel has been increased recently. That is, if the touch panel is flexible or bendable, the experience of a user will extend. However, indium tin oxide (ITO), which is most widely used for the transparent electrode of the touch panel, is easily subject to the physical damage when the substrate is flexed and bent, so that the electrode property is deteriorated. Therefore, the indium tin oxide (ITO) is not suitable for a flexible device.

BRIEF DESCRIPTION OF THE DRAWINGS

The embodiments will be described in detail with reference to the following drawings in which like reference numerals refer to like elements wherein.

DETAILED DESCRIPTION

Figure 1:
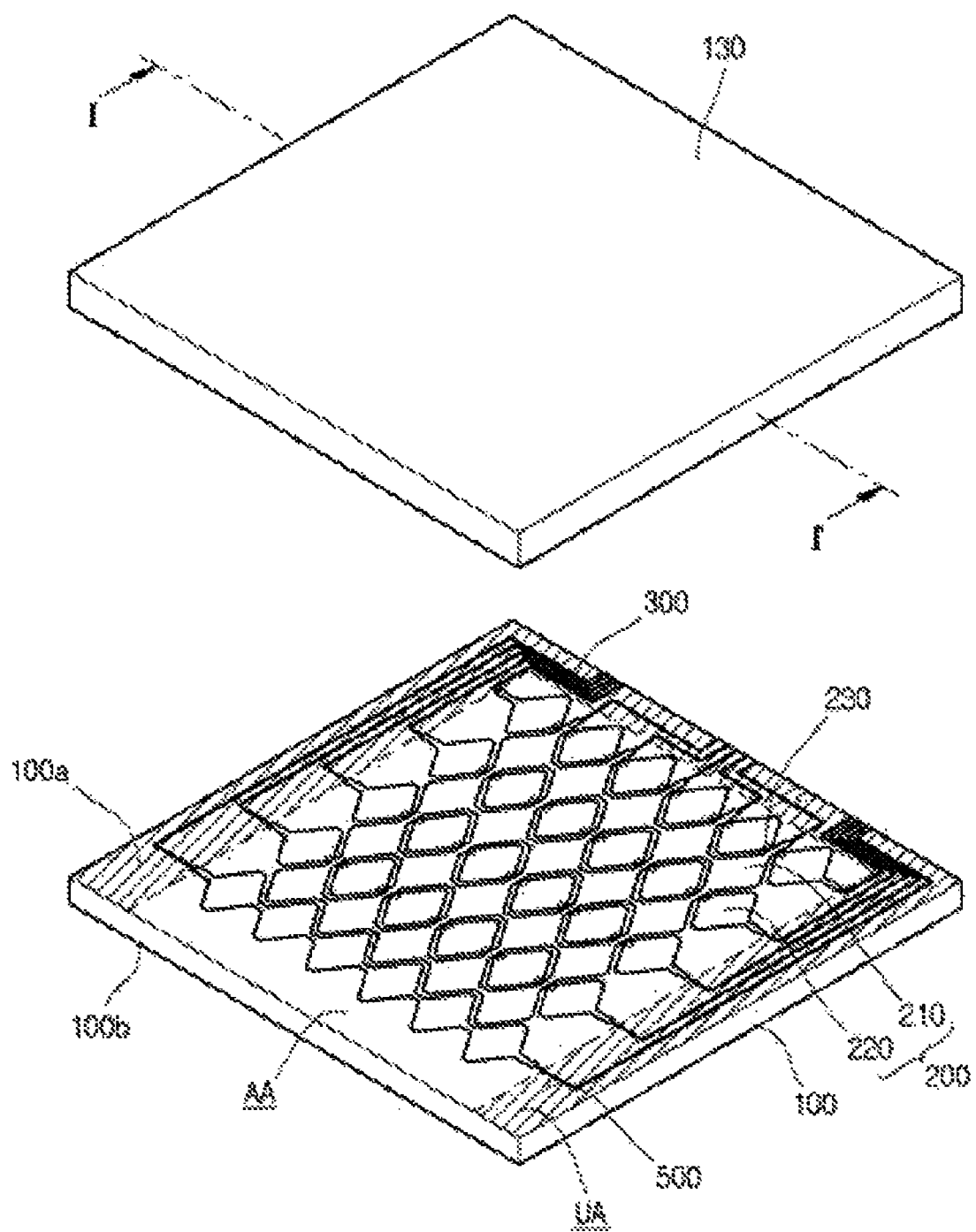
FIG. 1 is an exploded perspective view showing a touch window according to an embodiment.

A touch window according to an embodiment will be described in detail with reference to FIGS. 1 to 3. The touch window according to an embodiment may be a curved touch window or a flexible touch window which is bendable. If an input device, such as a finger, touches the touch window, capacitance variation may occur at a touch position, so that the touch position may be detected based on the capacitance variation.

The touch window according to an embodiment may include a cover substrate 130, a sensing electrode 200 and a wire 300.

The cover substrate 130 may be a curved cover substrate or a flexible cover substrate which may be bent. The cover substrate 130 may include glass or a plastic film. In detail, the cover substrate 130 may include tempered glass, semi-tempered glass, soda lime glass, reinforced plastic, or flexible plastic. The chemically tempered glass includes glass which is chemically tempered. For example, the chemically tempered glass may include soda lime glass or aluminosilicate glass.

The cover substrate 130 may have a predetermined strength to protect the sensing electrode 200 and the wire 300. The cover substrate 130 may include an active area AA and an unactive area UA. The active area AA refers to an area through which a touch instruction may be input by a user. To the contrary to the active area AA, the unactive area UA refers to an area to which the touch instruction is not input because the unactive area UA is not activated even if the touch of the user is input thereto.

A substrate 100 may be disposed under the cover substrate 130. The substrate 100 may support the sensing electrode and the wire formed on the substrate 100. The substrate 100 may include reinforced plastic or flexible plastic, such as polyimide (PI), polyethylene terephthalate (PET), propylene glycol (PPG) or polycarbonate (PC), or may include sapphire. In addition, the substrate 100 may include an optical isotropic film. For example, the substrate 100 may include cyclic olefin copolymer (COO), cyclic olefin polymer (COP), optical isotropic polycarbonate (PC), or optical isotropic polymethyl methacrylate (PMMA). The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance. However, the embodiment is not limited thereto, and the substrate 100 may include various materials to form the sensing electrode and the wire. The substrate 100 may be a curved substrate or a flexible substrate which may be bent.

Figure 2:
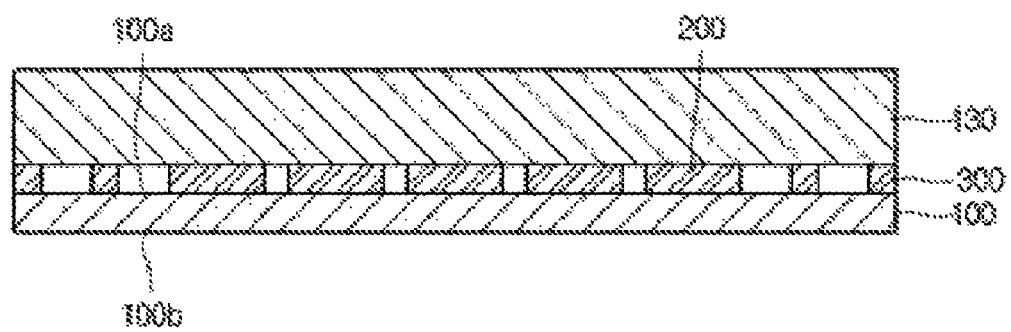
FIGS. 2 and 3 are sectional views taken along line I-I' of FIG. 1.
Figure 3:
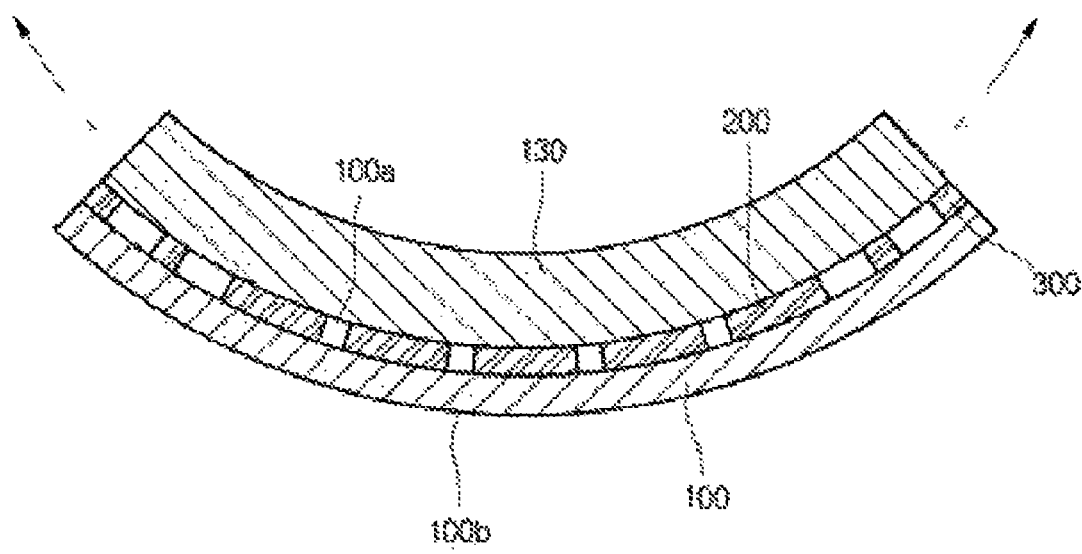

Referring to FIG. 2, the substrate 100 may include a first surface 100a and a second substrate 100b opposite to the first surface 100a. The first surface 100a may be combined with the cover substrate 130. Referring to FIG. 3, the substrate 100 may be bent inward about the first surface 100a. Thus, the first surface 100a of the substrate 100 may be compressed and the second surface 100b of the substrate 100 may be expanded.

The sensing electrode 200 may be disposed on the active area AA of the substrate 100. The sensing electrode 200 disposed on the active area AA may serve as a sensor for sensing a touch. The sensing electrode 200 may be disposed on the first surface 100a of the substrate 100. That is, the sensing electrode 200 may be disposed along the bending direction of the substrate 100. The sensing electrode 200 may be disposed on a compressed surface of the substrate 100.

When the touch window is bent, compressive force may be applied to the sensing electrode. The length of the sensing electrode may be shortened as compared with the original length thereof. The sensing electrode may be bent without being subject to the physical damage as compared with a case where tensile force is applied to the sensing electrode. Therefore, crack may not occur in the sensing electrode and durability of the sensing electrode may be ensured. That is, the bending property and reliability of the touch window may be improved.

Bridge electrodes 230 may be disposed on the active area AA. In detail, a first sensing electrode 210 extending in one direction and a second sensing electrode 220 extending in the other direction may be disposed on the active area AA. The bridge electrode 230 and the sensing electrode 200 may include a transparent conductive material which allows electricity to flow therethrough without interfering with light transmission. For instance, the bridge electrode 230 and the sensing electrode 200 may include metal oxide, such as indium tin oxide, indium zinc oxide, copper oxide, tin oxide, zinc oxide, or titanium oxide.

In addition, the bridge electrode 230 and the sensing electrode 200 may include a nanowire, a photosensitive nanowire film, carbon nanotube (CNT), graphene, conductive polymer or a mixture thereof. For example, the sensing electrode 2010 may include at least one of Cr, Ni, Cu, Al, Ag, Mo, and an alloy thereof. The bridge electrode 230 and the sensing electrode 200 may include the same material or mutually different materials.

Although the sensing electrode 200 having a rhombus shape is shown in the drawings, the embodiment is not limited thereto. The sensing electrode 200 may have various shapes, such as a polygonal shape including a triangular shape or a rectangular shape, a circular shape, a linear shape, an H shape or an oval shape. For example, the bridge electrodes 230 may have a bar shape. In detail, the bridge electrodes 230 having the bar shape are disposed on the active area AA while being spaced apart from each other by a regular interval. The bridge electrodes 230 may serve as connection electrodes for the first sensing electrode 210.

A printing layer 500 is disposed on the unactive area UA. The printing layer 500 may extend along an edge of the substrate 100. The printing layer 500 may be formed through one-color printing, two-color printing or three-color printing. The printing layer 500 may represent black or white by coating black ink or white ink according to the desired outer appearance thereof. In addition, the printing layer 500 may represent various colors, such as red or blue, by using various color films. The printing layer 500 may have at least one layer. For instance, the printing layer 500 may be prepared as a single layer or as at least two layers having widths different from each other.

The printing layer 500 may be formed of a film. If the substrate is flexible or has a curvature, it is difficult to form the printing layer on the cover substrate 130. In this case, the printing layer is formed on the film and then the film is formed on the curved or flexible cover substrate to facilitate the manufacturing process. The film may include an optical isotropic film. The printing layer 500 may be formed on a side of the substrate, which is adjacent to the cover substrate, or on another side of the substrate which is opposite to the cover substrate. The printing layer 500 may cover the wire 300, which will be described later, such that the wire 300 cannot be viewed from the outside. In addition, a pattern may be formed on the printing layer 500 to realize a desired logo.

The wire 300 may be formed on the unactive area UA to electrically connect the sensing electrode 200. One end of the wire 300 may be connected to the sensing electrode 200 and the other end of the wire 300 may be connected to a printed circuit board. In detail, the wire 300 is connected to the sensing electrode 200 and drawn to an upper end or a lower end of the substrate 100. In addition, a pad part is disposed on the other end of the wire 300 and connected to the printed circuit board.

The wire 300 may be formed of metal having superior electric conductivity. For instance, the wire 300 may include chrome (Cr), nickel (Ni), copper (Cu), aluminum (Al), silver (Ag), molybdenum (Mo), and an alloy thereof. Especially, the wire 300 may include various metal paste materials which can be formed through a printing process.

Various types of printed circuit board can be employed. For instance, a flexible printed circuit board (FPCB) can be used. Although not shown in the drawings, an adhesive layer may be disposed between the cover substrate 130 and the substrate 100. For example, the adhesive layer may include optical clear adhesive (OCA) or a photoresist film.

A touch window according to another embodiment will be described with reference to FIGS. 4 and 5. For the purpose of clarity and simplicity, detailed description about the same or similar elements or parts, which have already been described above, will be omitted.

Figure 4:
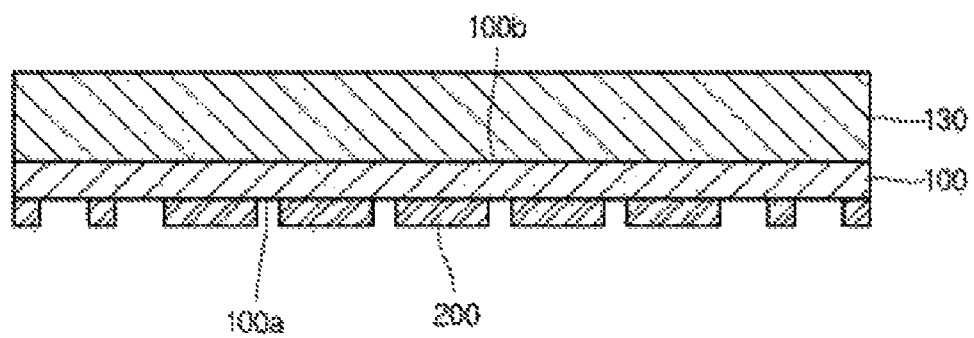
FIGS. 4 to 6 are sectional views showing a touch window according to another embodiment.
Figure 5:
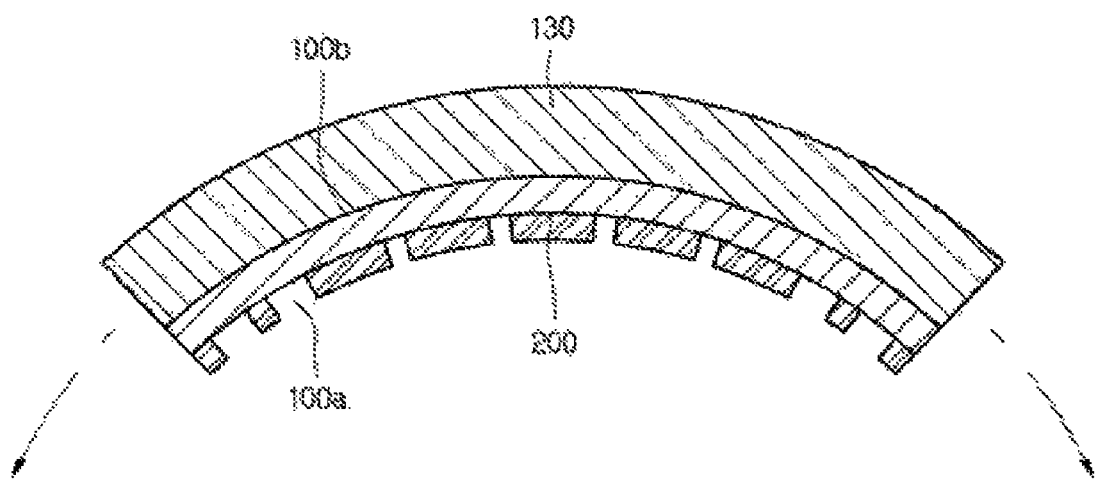

Referring to FIGS. 4 and 5, the substrate 100 is disposed under the cover substrate 130 and the second surface 100b of the substrate 100 may be combined with the cover substrate 130. The sensing electrode 200 is disposed on the first surface 100a of the substrate and the substrate 100 may be bent inward about the first surface 100a. In addition, referring to FIG. 5, the sensing electrode may also be disposed on the cover substrate 130. Thus, various stack-up structures may be ensured.

Figure 6:
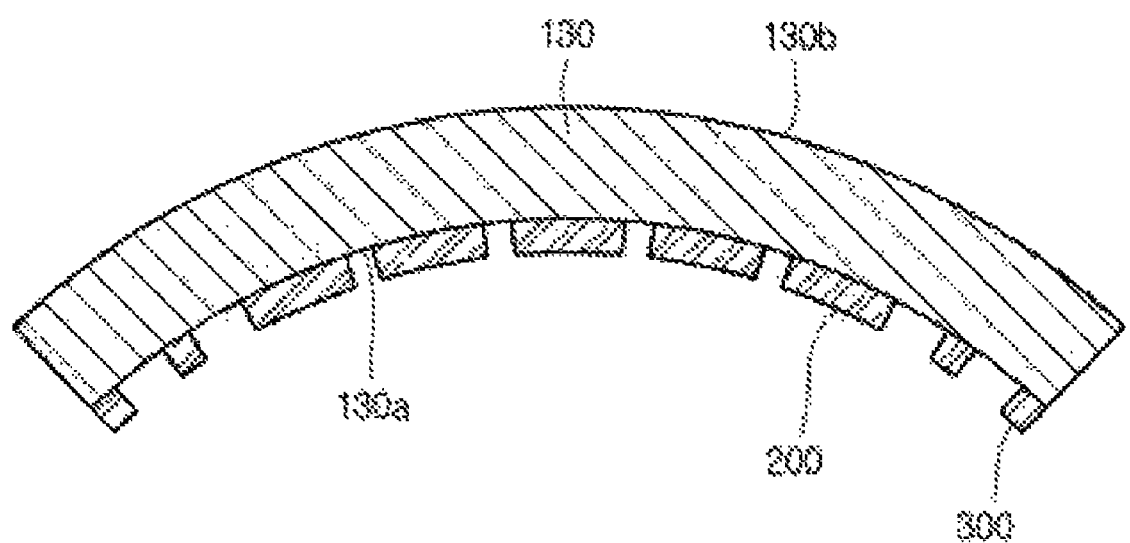

Referring to FIG. 6, the cover substrate 130 of the touch window according to another embodiment may include a first surface 130a and a second surface 130b, which are opposite to each other, and the sensing electrode 200 may be directly disposed on the cover substrate 130. At this time, the cover substrate 130 is bent inward about the first surface 130a and the sensing electrode 200 may be disposed on the first surface 130a.

Figure 7:
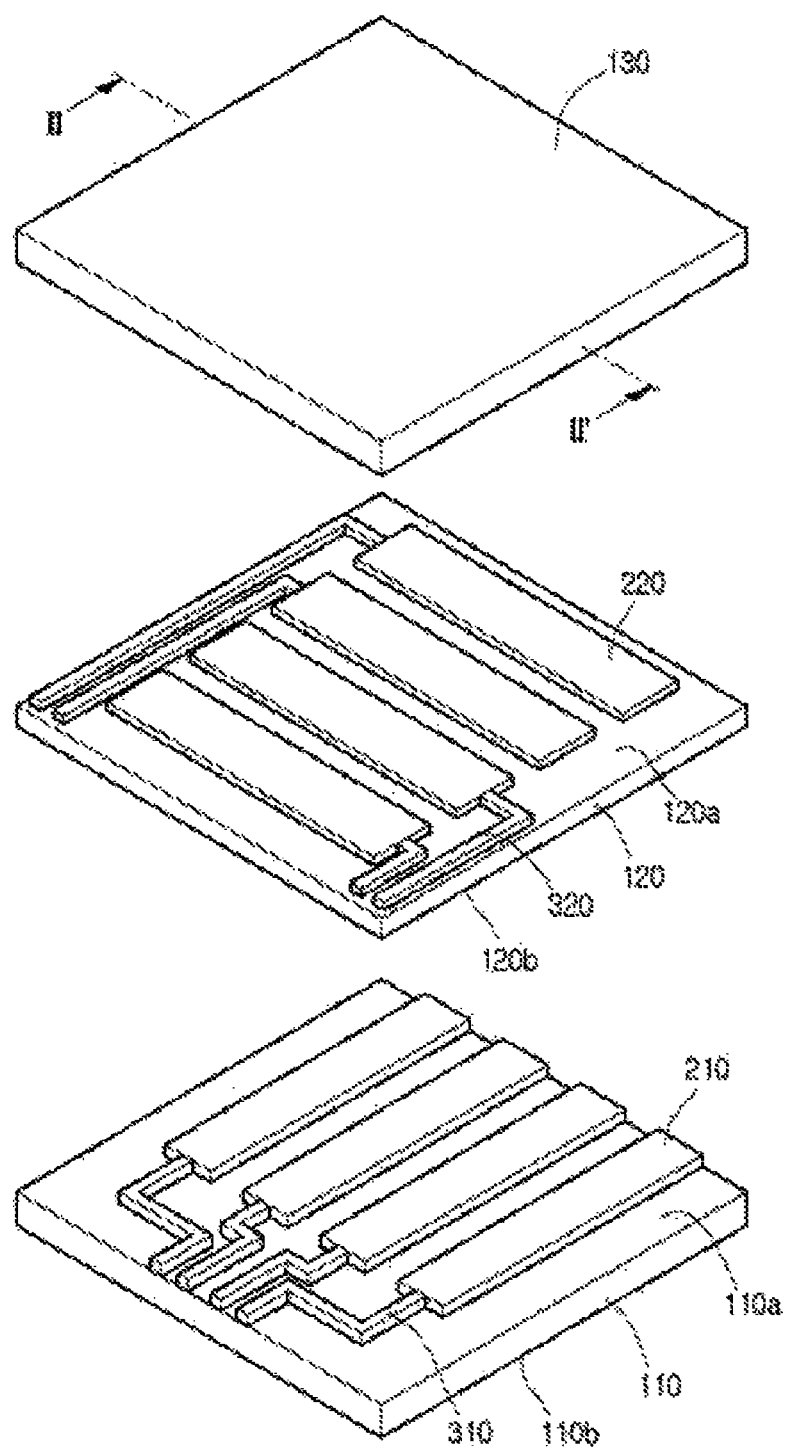
FIG. 7 is an exploded perspective view showing a touch window according to another embodiment.
Figure 8:
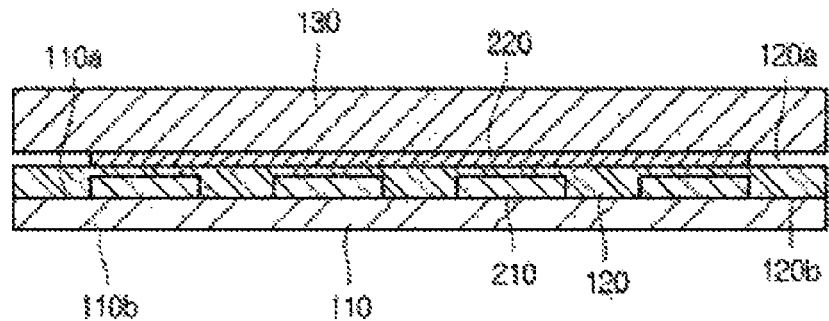
FIGS. 8 and 9 are sectional views taken along line II-II' of FIG. 1.
Figure 9:
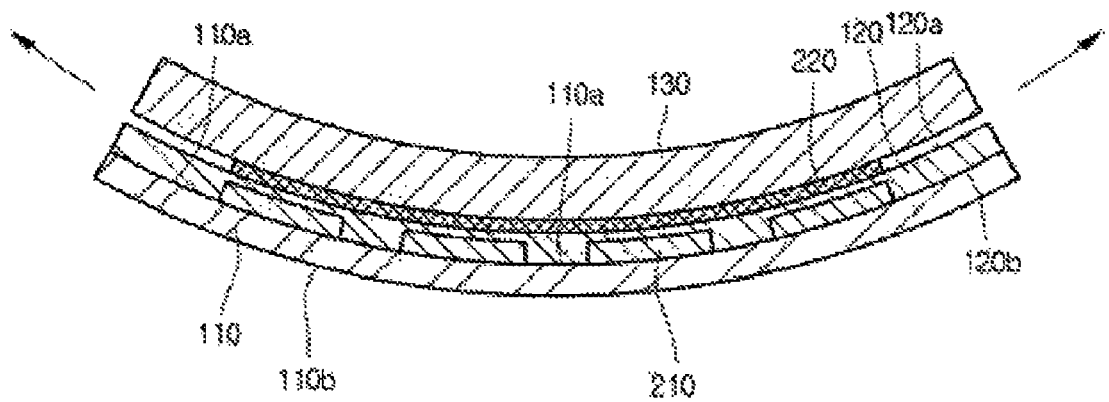

Referring to FIGS. 7 to 9, the substrate 100 of the touch window according to still another embodiment includes a first substrate 110 and a second substrate 120. In this case, a first sensing electrode 210 may be disposed on the first substrate 110 and a second sensing electrode 220 may be disposed on the second substrate 120.

The first substrate 110 may include a first surface 110a and a second surface 110b, which are opposite to each other. The first surface 110a may be combined with the second substrate 120.

Referring to FIG. 9, the first substrate 110 may be bent inward about the first surface 110a. The first surface 110a of the first substrate 110 may be compressed and the second surface 110b of the first substrate 110 may be expanded. In this case, the first sensing electrode 210 may be disposed on the first surface 110a of the first substrate 110.

Similarly to the first substrate 110, the second substrate 120 may include a first surface 120a and a second surface 120b, which are opposite to each other. The first surface 120a may be combined with the cover substrate 130.

Referring to FIG. 9, the second substrate 120 may be bent inward about the first surface 120a. The first surface 120a of the second substrate 120 may be compressed and the second surface 120b of the second substrate 120 may be expanded. In this case, the second sensing electrode 220 may be disposed on the first surface 120a of the second substrate 120.

The first and second substrates 110 and 120 may include mutually different materials. For instance, the second substrate 120 may include a dielectric material. The second substrate 120 may have a thickness thinner than a thickness of the first substrate 110.

If the second substrate 120 includes the dielectric material, the second substrate 120 may be directly formed on the top surface of the first substrate 110. The second substrate 120 may be formed by directly applying the dielectric material on the top surface of the first substrate 110. Then, the second sensing electrode 220 may be formed on the second substrate 120. An additional adhesive layer (OCA/OCR) may not be necessary between the second substrate 120 and the first substrate 110, so that the thickness can be reduced as compared with the structure using two film substrates.

Figure 10:
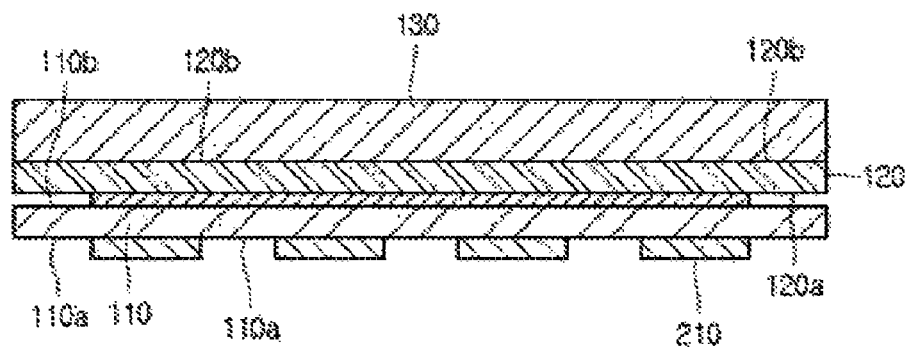
FIGS. 10 to 12 are sectional views showing a touch window according to another embodiment.
Figure 11:
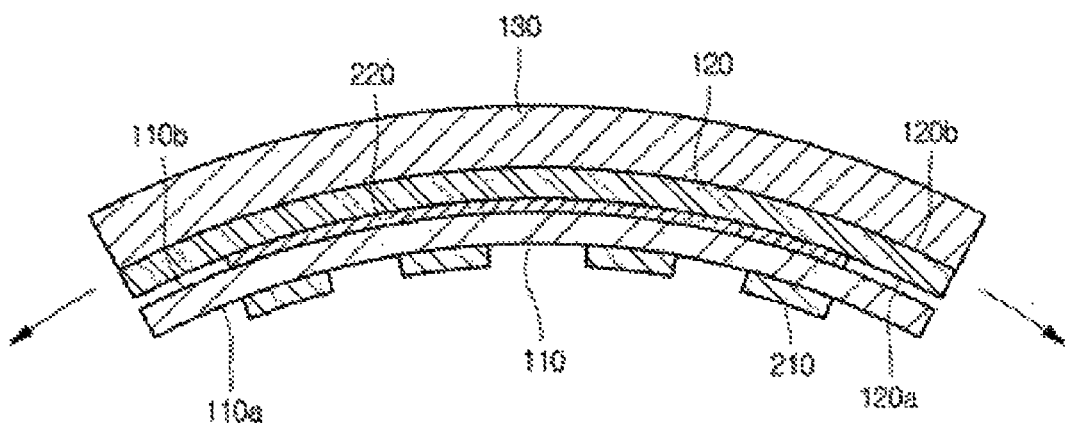

Referring to FIGS. 10 and 11, in the touch window according to still another embodiment, the second surface 110b of the first substrate 110 may be combined with the second substrate 120. In addition, the second surface 120b of the second substrate 120 may be combined with the cover substrate 130. Thus, various stack-up structures may be ensured.

Figure 12:
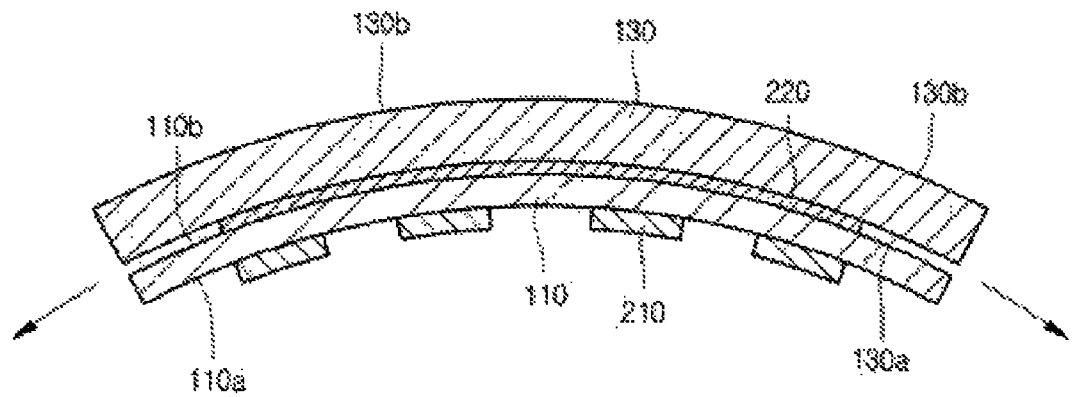

Referring to FIG. 12, the touch window according to still another embodiment may include the cover substrate 130 and the substrate 110. The second sensing electrode 220 may be disposed on the cover substrate 130 and the first sensing electrode 210 may be disposed on the substrate 110. The cover substrate 130 may include a first surface 130a and a second surface 130b, which are opposite to each other. The first surface 130a may be combined with the substrate 110.

Referring to FIG. 12, the cover substrate 130 may be bent inward about the first surface 130a. The first surface 130a of the cover substrate 130 may be compressed and the second surface 130b of the cover substrate 130 may be expanded.

In this case, the second sensing electrode 220 may be disposed on the first surface 130a of the cover substrate 130. Similarly to the cover substrate 130, the substrate 110 may include a first surface 110a and a second surface 110b, which are opposite to each other. The second surface 110b may be combined with the cover substrate 130.

Referring to FIG. 12, the substrate 110 may be bent inward about the first surface 110a. Thus, the first surface 110a of the substrate 110 may be compressed and the second surface 110b of the substrate 110 may be expanded. In this case, the first sensing electrode 210 may be disposed on the first surface 110a of the substrate 110.

Figure 13:
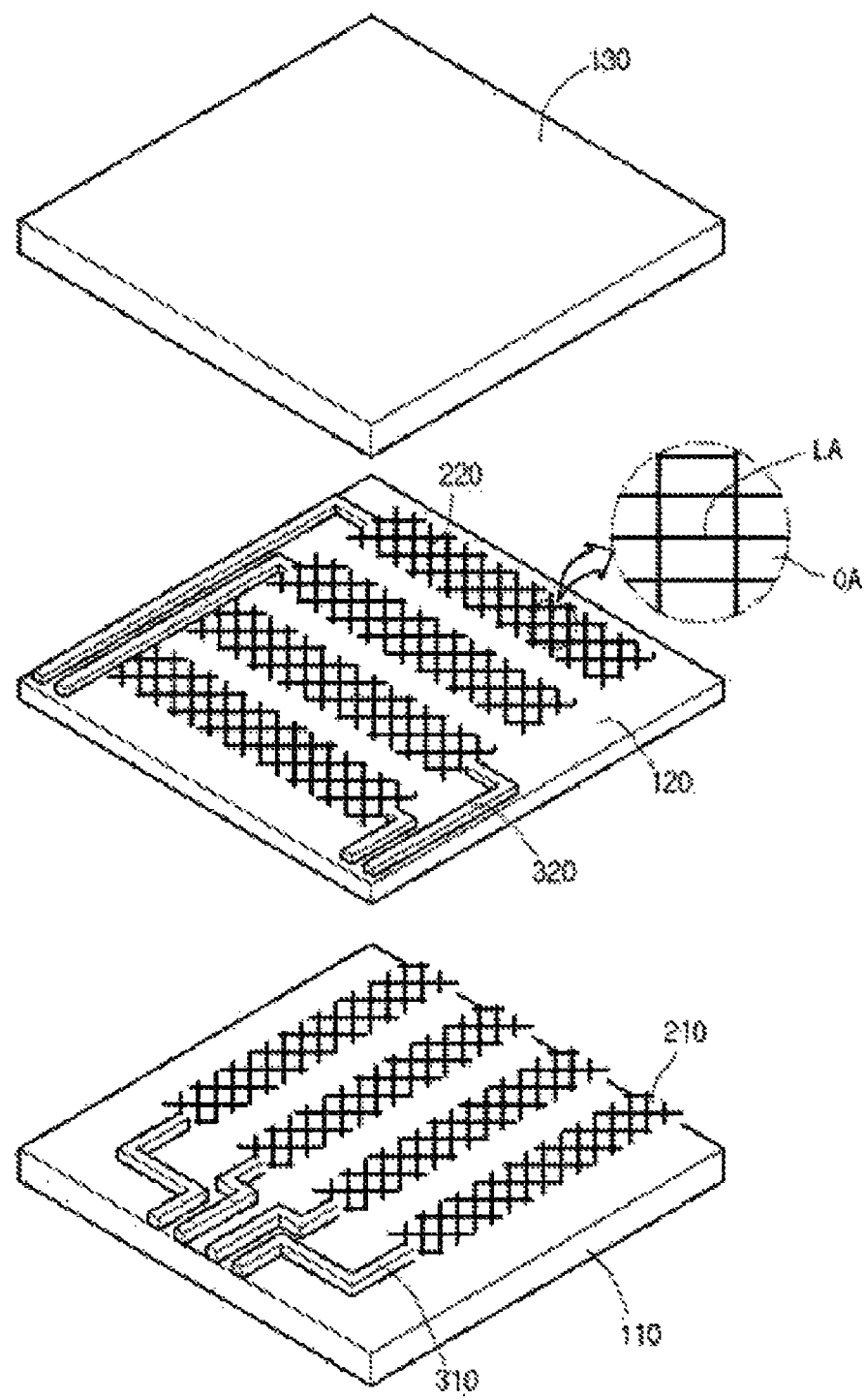
FIG. 13 is an exploded perspective view showing a touch window according to still another embodiment.

Referring to FIG. 13, the first and second electrodes 210 and 220 may include a conductive pattern. That is, the first and second electrodes 210 and 220 may be disposed in a mesh shape.

Since the first and second electrodes 210 and 220 are disposed in the conductive pattern shape, the first and second electrodes 210 and 220 may include a pattern opening OA and a pattern line LA. In this case, a line width of the pattern line LA may be in the range of 0.1 µm to 10 µm. The pattern LA having a line width of 0.1 µm or less may not be formed through the manufacturing process or may cause short circuit. If the line width excesses 10 µm, the electrode pattern may be viewed from the outside, thereby deteriorating the visibility. If the line width is 10 µm or less, the pattern of the second sensing electrode 220 may not be viewed from the outside, Preferably, the line width of the pattern line LA may be in the range of about 0.5 µm to about 7 µm. More preferably, the line width of the pattern line LA may be in the range of about 1 µm to about 3.5 µm.

Meanwhile, as shown in FIG. 13, the pattern opening OA may have various shapes. For instance, the pattern opening OA may have a polygonal shape including a rectangular shape, a diamond shape, a pentagonal shape or a hexagonal shape, or a circular shape. In addition, the pattern opening OA may have a regular shape or a random shape. However, the embodiment is not limited to the above. For instance, the conductive pattern opening may have an irregular shape. That is, the conductive pattern opening having various shapes may be formed in one conductive pattern. Thus, the electrode 200 may include the conductive pattern opening having various shapes.

Since the first and second electrodes 210 and 220 have a mesh shape, the pattern of the first and second electrodes 210 and 220 may not be viewed in a display area. In other words, even when the first and second electrodes 210 and 220 are formed of metal, the pattern may not be viewed. In addition, even when the first and second electrodes 210 and 220 are applied to a large-size touch window, the resistance of the touch window may be reduced. Further, when the first and second electrodes 210 and 220 are formed through a printing process, the printing quality may be improved, so that the high-quality touch window may be secured.

Figure 14:
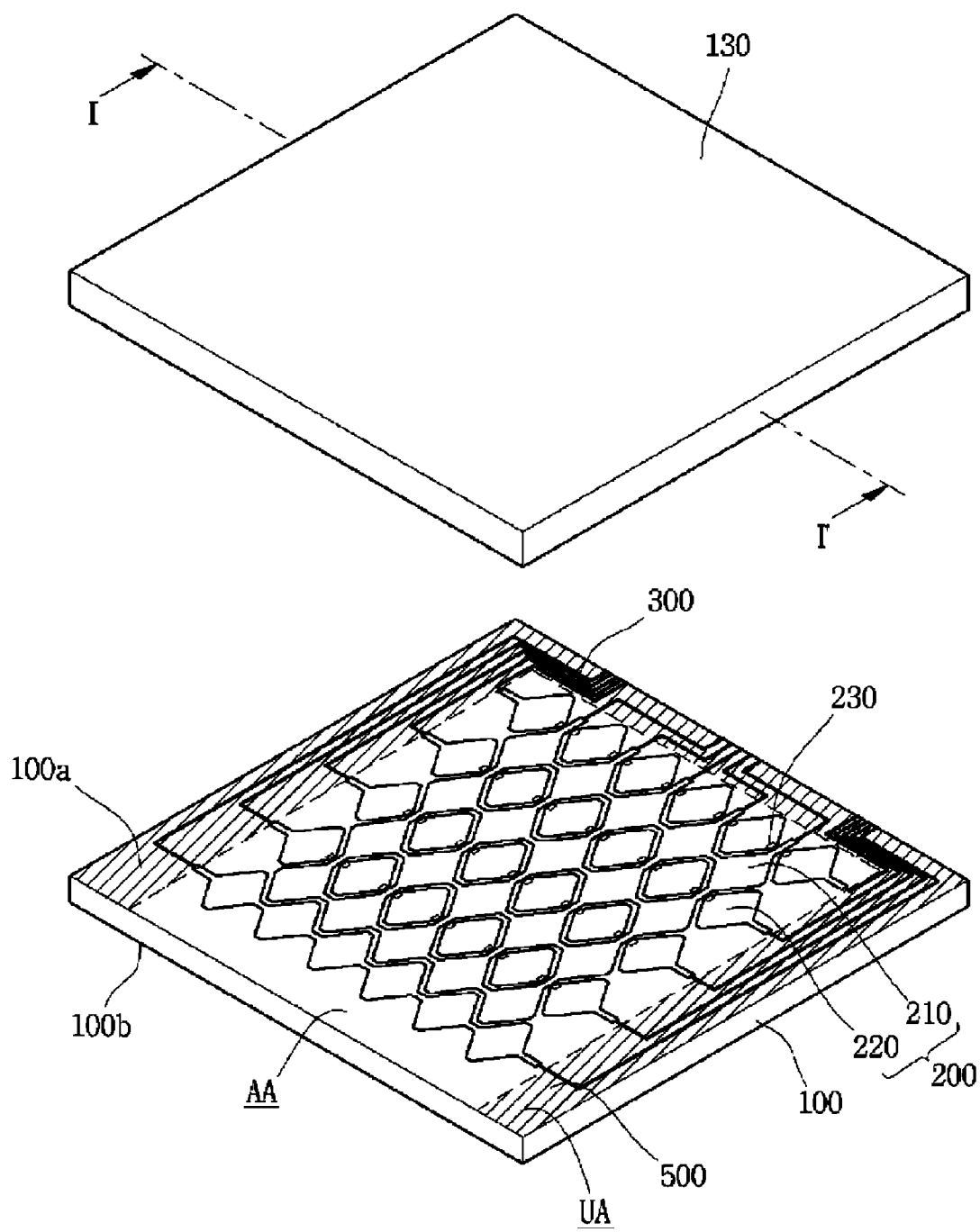
FIGS. 14 to 17 are views showing a touch device having a touch panel combined with a display panel according to an embodiment.
Figure 15:
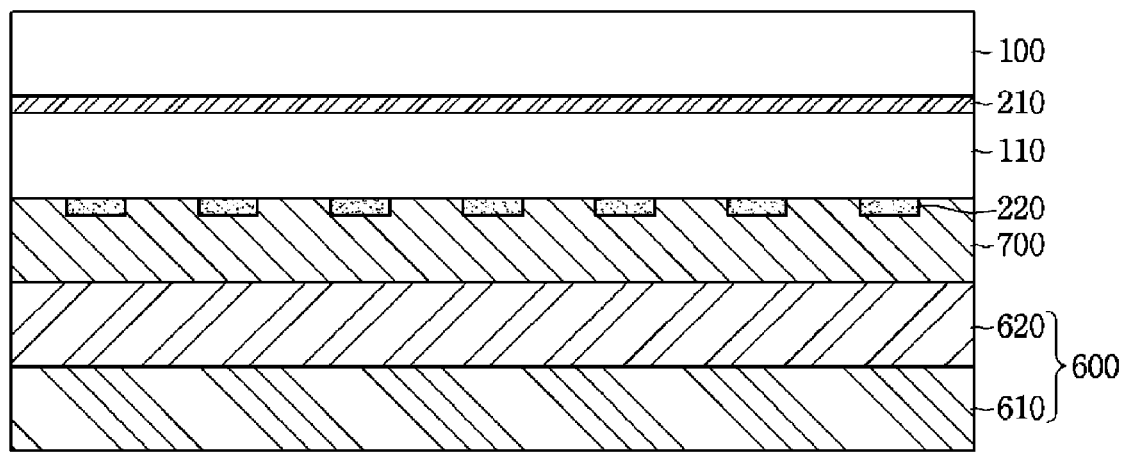

Referring to FIGS. 14 and 15, the touch device according to the embodiment may include the touch panel disposed on a display panel 600. Referring to FIG. 14, the touch device may be prepared by coupling the cover substrate 130 with the display panel 600. The cover substrate 130 and the display panel 600 may be bonded to each other through an adhesive layer 700. For example, the cover substrate 130 may be combined with the display panel 600 by the adhesive layer 700 including the optical clear adhesive (OCA).

Otherwise, referring to FIG. 15, when the substrate 100 is further disposed on the cover substrate 130, the touch device may be prepared by coupling the substrate 100 with the display panel 600. The substrate 100 and the display panel 600 may be bonded to each other through the adhesive layer 700. For example, the substrate 100 may be combined with the display panel 600 by the adhesive layer 700 including the optical clear adhesive (OCA).

The display panel 600 may include a first substrate 610 and a second substrate 620. If the display panel 600 is a liquid crystal display panel, the display panel 600 may have a structure in which the first substrate 610 including a thin film transistor (TFT) and a pixel electrode is combined with the second substrate 620 including color filter layers while a liquid crystal layer is interposed between the first and second substrates 610 and 620.

In addition, when the display panel 600 is a liquid crystal panel, the display device may further include a backlight unit for supplying light onto a rear surface of the display panel 600.

Further, the display panel 600 may be a liquid crystal display panel having a color filter on transistor (COT) structure formed by combining the first substrate 610, which is formed thereon with the TFT, a color filter, and a black matrix, with the second substrate 620 while the liquid crystal layer is interposed between the first and second substrates 610 and 620. In other words, the TFT may be formed on the first substrate 610, a protective layer may be formed on the TFT, and the color filter layer may be formed on the protective layer. In addition, the pixel electrode, which makes contact with the TFT, may be formed on the first substrate 610. In this case, in order to improve an aperture ratio and simplify a mask process, the black matrix may be omitted, and a common electrode may perform a function of the black matrix together with the inherent function thereof.

When the display panel 600 is an organic electroluminescence light emitting device, the display panel 600 includes self-luminescence device which does not require any additional light source. A thin film transistor is formed on the first substrate 610 of the display panel 600, and an organic light-emitting device making contact with the thin film transistor is formed. The organic light-emitting device may include an anode, a cathode and an organic light-emitting layer formed between the anode and the cathode. In addition, the display panel 600 may further include the second substrate 620, which performs the function of an encapsulation substrate for encapsulation, on the organic light-emitting device.

Figure 16:
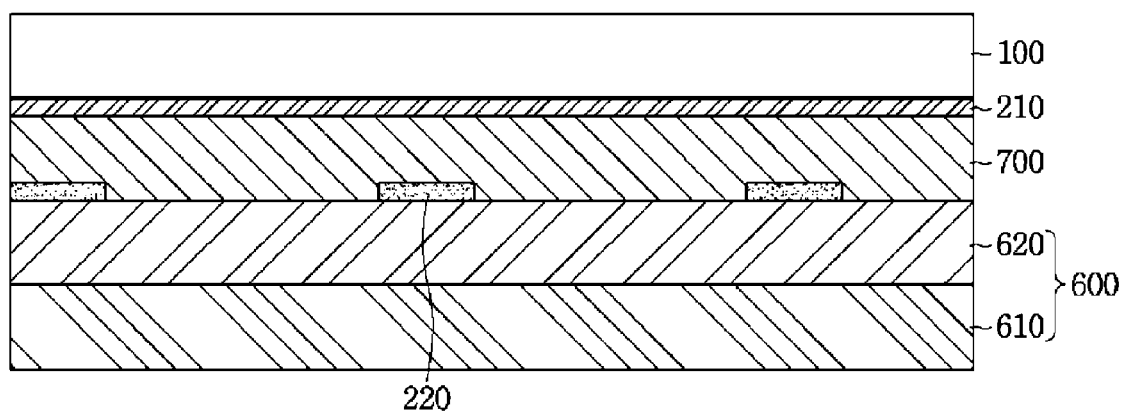

Referring to FIG. 16, the touch device according to the embodiment may include a touch panel integrated with the display panel 600. A substrate for supporting at least one sensing electrode may be omitted. At least one sensing electrode may be disposed on at least one surface of the display panel 600. At least one sensing electrode may be disposed on one surface of at least one of the first and second substrates 610 and 620. At least one sensing electrode may be formed on the top surface of the substrate positioned at an upper portion.

Referring to FIG. 12, the first sensing electrode 210 may be disposed on one surface of the cover substrate 100. In addition, the first wire connected to the first sensing electrode 210 may be disposed. Further, the second sensing electrode 220 may be disposed on one surface of the display panel 600. In addition, the second wire connected to the second sensing electrode 220 may be disposed.

The adhesive layer 700 may be disposed between the cover substrate 100 and the display panel 600 to combine the cover substrate 100 with the display panel 600. In addition, a polarizing plate may be disposed under the cover substrate 100. The polarizing plate may be a linear polarizing plate or an anti-reflection polarizing plate. For example, when the display panel 600 is a liquid crystal display panel, the polarizing plate may be a linear polarizing plate. In addition, when the display panel 600 is an organic electroluminescence display panel, the polarizing plate may be an anti-reflection polarizing plate.

The touch device according to the embodiment may allow at least one substrate supporting the sensing electrode to be omitted. For this reason, a touch device having a thin thickness and a light weight may be formed.

Figure 17:
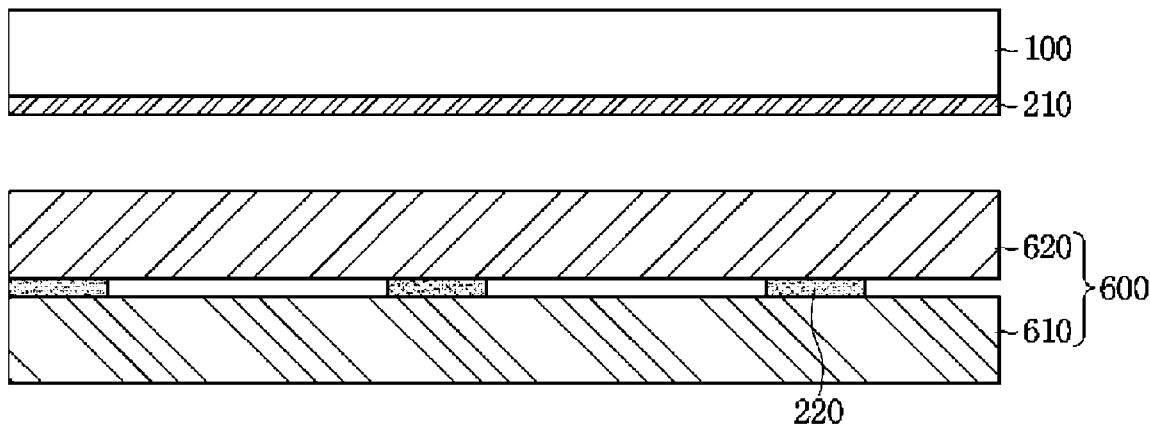

Referring to FIG. 17, the touch device according to still another embodiment may include a touch window integrated with a display panel 600. A substrate for supporting at least one sensing electrode may be omitted. For example, a sensing electrode, which serves as a sensor disposed in an active area to sense a touch, and a wire, through which an electrical signal is applied to the sensing electrode, may be formed inside the display panel. In detail, at least one sensing electrode or at least one wire may be disposed inside the display panel.

The display panel 600 includes first and second substrates 610 and 620. In this case, at least one of the first and second electrodes 210 and 220 is disposed between the first and second substrates 610 and 620. That is, at least one sensing electrode may be formed on at least one surface of the first or second substrate 610 or 620. The first sensing electrode 210 may be formed on one surface of the cover substrate 100. In addition, the first wire connected to the first sensing electrode 210 may be disposed. Further, the second sensing electrode 220 and the second wire may be formed between the first and second substrates 610 and 620. That is, the second sensing electrode 220 and the second wire may be disposed inside the display panel, and the first sensing electrode 210 and the first wire may be disposed outside the display panel.

The second sensing electrode 220 and the second wire may be disposed on the top surface of the first substrate 610 or the rear surface of the second substrate 620. In addition, a polarizing plate may be further disposed under the cover substrate 100.

When the display panel is a liquid crystal display panel and the second sensing electrode is formed on the top surface of the first substrate 610, the sensing electrode may be formed with a thin film transistor (TFT) and a pixel electrode. In addition, when the second sensing electrode is formed on the rear surface of the second substrate 620, a color filter layer may be formed on the sensing electrode or the sensing electrode may be formed on the color filter layer. When the display panel is an organic electroluminescence light emitting device and the second sensing electrode is formed on the top surface of the first substrate 610, the sensing electrode may be formed with a thin film transistor or an organic light emitting device.

The touch device according to the embodiment may allow an additional substrate supporting the sensing electrode to be omitted. For this reason, the touch device having a thin thickness and a light weight may be formed. In addition, the process can be simplified and the cost can be saved by forming the sensing electrode and the wire together with the device formed on the display panel.

Hereinafter, one example of the display device to which the touch window according to the above-described embodiments is applied will be described with reference to FIGS. 18 to 21.

Figure 18:
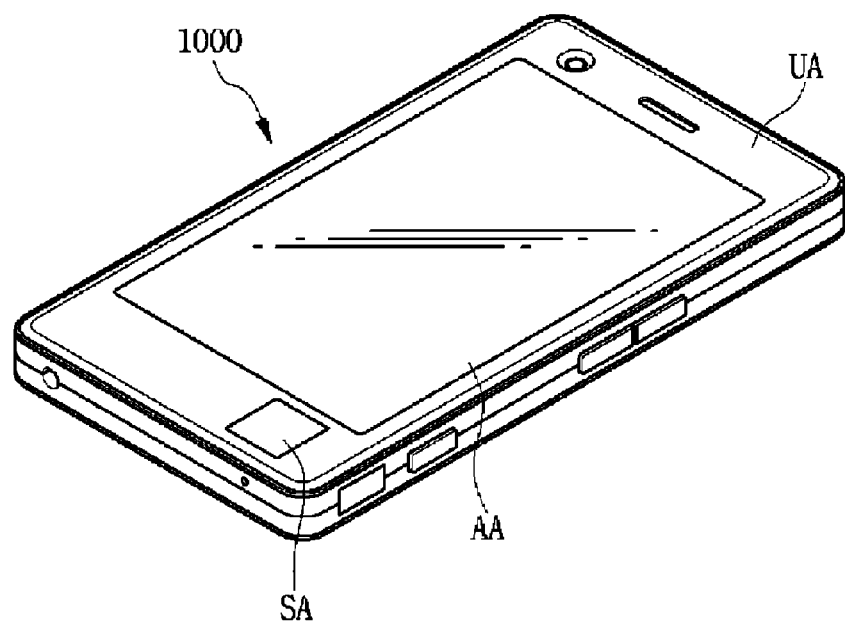
FIGS. 18 to 21 are views showing a display device to which a touch window according to an embodiment is applied.

Referring to FIG. 18, a mobile terminal is shown as one example of the touch device. The mobile terminal may include an active area AA and an unactive area UA. The active area AA may sense a touch signal through the touch by a finger, and a command icon pattern part and a logo may be formed in the unactive area UA.

Figure 19:
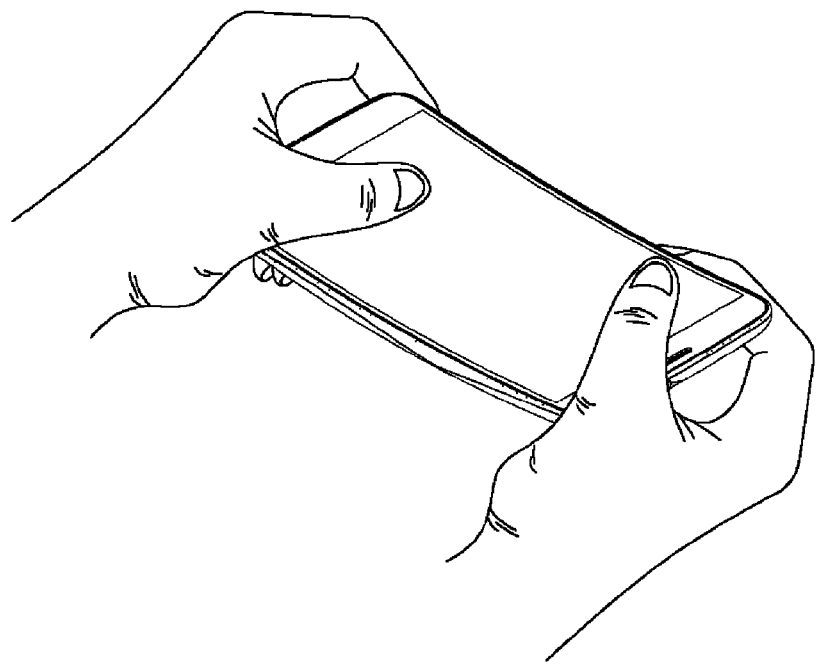

Referring to FIG. 19, the touch window may include a flexible touch window that is bendable. Accordingly, the touch device including the touch window may be a flexible touch device. Therefore, a user can curve or bend the flexible touch window with a hand. Such a flexible touch window may be implemented for a wearable touch.

Figure 20:
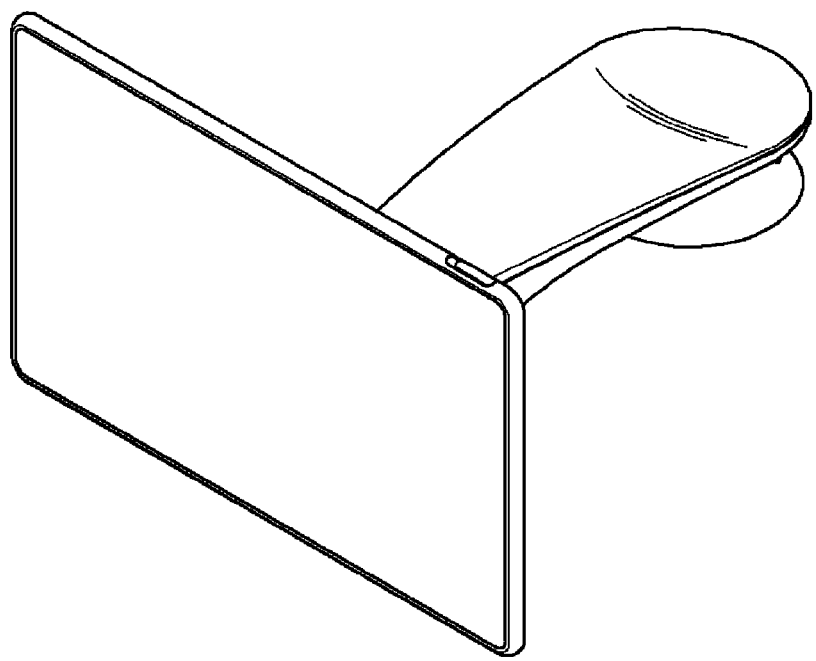

Referring to FIG. 20, the touch window may be applied to a vehicle navigation system as well as the touch device of a mobile terminal.

Figure 21:
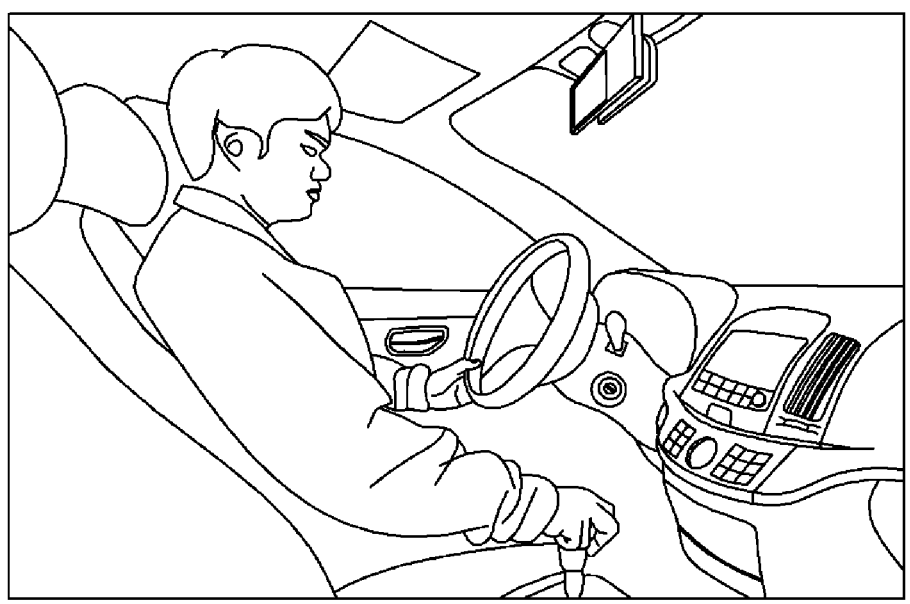

In addition, referring to FIG. 21, the touch window may be applied to an inner part of a vehicle. In other words, the touch window may be applied to various parts in the vehicle. Accordingly, the touch window may be applied to a dashboard as well as a PND (Personal Navigation Display), so that a CID (Center Information Display) may be realized. However, the embodiment is not limited to the above, and the display device may be used for various electronic appliances.

The embodiment provides a touch window which is bendable and a display device including the same.

A touch window according to the embodiment includes a substrate; and a sensing electrode disposed on the substrate to sense a position, wherein the sensing electrode is disposed in a bending direction of the substrate.

A touch device according to the embodiment includes a display panel; and a touch window on the display panel, wherein the touch window includes a substrate; and a sensing electrode disposed on the substrate to sense a position, and wherein the sensing electrode is disposed in a bending direction of the substrate.

According to the embodiment, compressive force may be applied to the sensing electrode when the touch window is bent. Thus, the sensing electrode may be bent without being subject to the physical damage as compared a case where tensile force is applied to the sensing electrode. Therefore, crack may not occur in the sensing electrode and durability of the sensing electrode may be ensured. That is, the bending property and reliability of the touch window may be improved.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

When a part is referred as to be connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch device for a mobile terminal, comprising;
   a display panel;
   a curved touch window on the display panel; and
   a polarizing plate between the display panel and the curved touch window,
   wherein the display panel is an organic electroluminescence light emitting device,
   wherein the display panel includes a first substrate and a second substrate,
   wherein a thin film transistor and an organic light-emitting device are formed on the first substrate,
   wherein the second substrate is an encapsulation substrate on the organic light-emitting device, and
   wherein the curved touch window includes:
      a substrate;
      a cover substrate on the substrate and including an active area and an inactive area;
      a sensing electrode and a wire disposed on the substrate;
      a printing layer between the substrate and the cover substrate; and
      an adhesive layer disposed between the cover substrate and the substrate
   wherein the cover substrate is curved,
   wherein the cover substrate includes a glass,
   wherein a touch instruction is input through the active area,
   wherein the substrate includes polyethylene terephthalate (PET),
   wherein the substrate comprises a first surface facing the cover substrate and a second surface, which is opposite to the first surface,
   wherein the sensing electrode is provided between the cover substrate and the first surface of the substrate,
   wherein the sensing electrode includes:
      a first sensing electrode disposed on the first surface of the substrate and extending in one direction on an effective area;
      a second sensing electrode disposed on the first surface of the substrate and extending in a direction different from the extension direction of the first sensing electrode,
   wherein the first sensing electrode and the second sensing electrode include indium zinc oxide; and
   bridge electrodes are disposed on the active area to connect portions of the second sensing electrode that are spaced apart from each other,
   wherein the bridge electrode and the sensing electrode include different materials,
   wherein one end of the wire is electrically connected to the sensing electrode, other end of the wire is connected to a printed circuit board and drawn to an upper end or a lower end of the substrate,
   wherein the wire includes:
      a first wire connected to the first sensing electrode; and
      a second wire connected to the second sensing electrode,
      wherein the wire includes at least one of nickel (Ni) or copper (Cu),
      wherein the printing layer is disposed between the cover substrate and the substrate,
      wherein the printing layer is formed of a film, and
      wherein the polarizing plate is a linear polarizing plate or an anti-reflection polarizing plate.

2. The touch curved device of claim 1, wherein another adhesive layer is disposed between the display panel and the curved touch window, and the other adhesive layer includes an optical clear adhesive (OCA).

3. The touch device of claim 1, wherein the sensing electrode has a rhombus shape, and the bridge electrode has a bar shape.

4. The touch curved device of claim 1, wherein the sensing electrode is provided over a compressed surface of the substrate.

5. The touch curved device of claim 1, wherein the sensing electrode has a conductive pattern.

6. The touch curved device of claim 1, wherein the cover substrate is bent inward about the first surface of the substrate.

7. The touch curved device of claim 1, wherein a pad part is disposed on the other end of the wire.

8. The touch curved device of claim 1, wherein the cover substrate includes a first surface facing the substrate and a second surface opposite the substrate, and wherein the cover substrate is bent inward about the first surface of the cover substrate.

9. The touch curved device of claim 1, wherein the adhesive layer includes an optical clear adhesive (OCA).

\* \* \* \* \*